United States Patent
Won et al.

(10) Patent No.: US 7,042,698 B2
(45) Date of Patent: May 9, 2006

(54) MEMS TUNABLE CAPACITOR WITH A WIDE TUNING RANGE AND METHOD OF FABRICATING THE SAME

(75) Inventors: Seok-Jun Won, Seoul (KR); Kang-soo Chu, Suwon-si (KR); Weon-Hong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/047,762

(22) Filed: Feb. 2, 2005

(65) Prior Publication Data

US 2005/0168910 A1 Aug. 4, 2005

(30) Foreign Application Priority Data

Feb. 4, 2004 (KR) .................. 10-2004-0007363

(51) Int. Cl.
*H01G 5/00* (2006.01)
(52) U.S. Cl. .................. 361/277; 361/282; 361/292
(58) Field of Classification Search .................. 361/280, 361/277, 282, 287–288, 290, 291–292, 298.2, 361/293, 297
See application file for complete search history.

(56) References Cited

U.S. PATENT DOCUMENTS

| | | | | |
|---|---|---|---|---|
| 5,015,906 A | * | 5/1991 | Cho et al. ................... | 310/309 |
| 6,215,644 B1 | | 4/2001 | Dhuler ....................... | 361/280 |
| 6,355,534 B1 | | 3/2002 | Cheng et al. ............... | 438/379 |
| 6,380,600 B1 | | 4/2002 | Alping ....................... | 257/415 |
| 6,541,831 B1 | * | 4/2003 | Lee et al. ................... | 257/415 |
| 6,885,537 B1 | * | 4/2005 | Nakayama .................. | 361/277 |
| 6,970,340 B1 | * | 11/2005 | Nakayama .................. | 361/277 |

FOREIGN PATENT DOCUMENTS

KR 1020020085990 11/2002

* cited by examiner

*Primary Examiner*—Anthony Dinkins
(74) *Attorney, Agent, or Firm*—Lee & Morse, P.C.

(57) ABSTRACT

A MEMS tunable capacitor and method of fabricating the same, includes a plurality of fixed charge plates on a substrate, the plurality of fixed charge plates having a same height, being arranged in a shape of comb-teeth and being electrically connected to one another, a capacitor dielectric layer covering the plurality of fixed charge plates, a movable charge plate structure spaced apart from the capacitor dielectric layer, and arranged on the plurality of fixed charge plates, wherein the movable charge plate structure includes a plurality of movable charge plates arranged corresponding the plurality of fixed charge plates, and an actuator connected to the movable charge plate structure allowing the movable charge plate structure to move in a horizontal direction.

13 Claims, 6 Drawing Sheets

MEMS TUNABLE CAPACITOR WITH A WIDE TUNING RANGE AND METHOD OF FABRICATING THE SAME

BACKGROUND OF THE INVENTION

1. Field of the Invention

The present invention relates to a tunable capacitor and method of fabricating the same. More particularly, the present invention relates to a MEMS tunable capacitor with a wide tuning range and method of fabricating the same.

2. Description of the Related Art

As micromachining technology is developed, a microelectromechanical system (MEMS) tunable capacitor that can replace a varactor diode used for frequency tuning is sought. While varactor diodes are simple and robust, they have a limited tuning range.

A conventional tunable MEMS capacitor includes a fixed charge plate and a movable charge plate. The movable charge plate is positioned above the fixed charge plate, and moves up and down due to application of an electrostatic force. A stiffener is positioned on the movable charge plate. The stiffener prevents the movable charge plate from bending when the movable charge plate moves down.

The tunable capacitor having the stiffener has a wider tuning range than a varactor diode. Since the movable charge plate of the tunable capacitor may be moved up and down by application of an electrostatic force, a distance between the fixed charge plate and the movable charge plate may be varied, thus varying the capacitance. However, a distance that the movable charge plate may move up and down is limited due to a short circuit and an electrostatic force between the plates. As a result, the tuning range of this MEMS tunable capacitor is still limited. In other words, a variable capacitor in which the capacitance is varied by moving the movable charge plate up and down still has a limited tuning range.

SUMMARY OF THE INVENTION

The present invention is therefore directed to MEMS tunable capacitor and method of fabricating the same, which substantially overcome one or more of the problems due to the limitations and disadvantages of the related art.

It is a feature of an embodiment of the present invention to provide a MEMS tunable capacitor, and method of fabricating the same, which has a wide tuning range.

It is another feature of an embodiment of the present invention to provide a MEMS tunable capacitor, and method of fabricating the same, that prevents a short circuit between plates from occurring.

At least one of the above and other features and advantages of the present invention may be realized by providing a MEMS tunable capacitor including a substrate, a plurality of fixed charge plates on the substrate, the plurality of fixed charge plates having a same height, being arranged in a shape of comb-teeth and being electrically connected to one another, a capacitor dielectric layer covering the plurality of fixed charge plates, a movable charge plate structure spaced apart from the capacitor dielectric layer, and arranged on the plurality of fixed charge plates, wherein the movable charge plate structure includes a plurality of movable charge plates arranged corresponding the plurality of fixed charge plates, and an actuator connected to the movable charge plate structure allowing the movable charge plate structure to move in a horizontal direction.

The movable charge plate structure may include at least one connection part which physically connects the movable charge plates. The connection part may connect end portions of the movable charge plates.

Corresponding ones of the plurality of fixed charge plates and the plurality of movable charge plates may have a same width. Each of the plurality of fixed charge plates may be spaced apart from each other by at least a width of a corresponding movable charge plate.

The MEMS tunable capacitor may include a supporter fixed on the substrate supporting the actuator. A power line may be connected to the supporter, the power line being electrically connected to the movable charge plates through the supporter and the actuator.

The MEMS tunable capacitor may include a lower interconnection line arranged below the plurality of fixed charge plates and connecting the plurality of fixed charge plates, the plurality of fixed charge plates being electrically connected to each other through the lower interconnection line. The lower interconnection line may be electrically connected to each of the plurality of fixed charge plates through vias.

The actuator may be a spring structure. The spring structure may include a first spring attached to a first end of the movable charge plate structure and a second spring attached to a second end of the movable charge plate structure. The first and second springs may be different. One of the first and second springs may be a thermal actuator.

At least one of the above and other features and advantages of the present invention may be realized by providing a method of fabricating a MEMS tunable capacitor including forming an interlayer insulation layer on a substrate, forming fixed charge plates spaced apart from one another on the substrate by the interlayer insulation layer and arranged in a shape of comb-teeth, forming a capacitor dielectric layer on the substrate having the fixed charge plates, sequentially forming a sacrificial layer and a molding layer on the capacitor dielectric layer, forming a supporter which penetrates the molding layer and the sacrificial layer and is fixed on the substrate, forming a spring structure and a movable charge plate structure defined in the molding layer, the spring structure connecting the supporter and the movable charge plate structure, and the movable charge plate structure includes movable charge plates respectively corresponding to the fixed charge plates and a connection part connecting the movable charge plates, and removing the molding layer and the sacrificial layer.

The spring structure may be formed by patterning the molding layer to form a groove which defines a region of the spring structure, filling the groove with a spring conductive layer, and planarizing the spring conductive layer until the molding layer is exposed.

The movable charge plate structure may be formed by patterning the molding layer to form grooves which define movable charge plate regions and a connection region after forming the spring structure, filling the groves with a movable charge plate conductive layer, and planarizing the movable charge plate conductive layer until the molding layer is exposed. A power line may be formed concurrently with forming the fixed charge plates. Forming the supporter may include sequentially patterning the molding layer, the sacrificial layer and the capacitor dielectric layer to form an opening which exposes the power line, filling the opening with a supporting conductive layer, and planarizing the supporting conductive layer until a top surface of the molding layer is exposed.

The molding layer may be a silicon oxide layer. An etch-stop layer may be formed before forming the molding layer. The etch-stop layer may be an aluminum oxide layer. The sacrificial layer may be one of a silicon oxide layer and an aluminum oxide layer. The capacitor dielectric layer may be formed of a layer selected from a group consisting of a silicon nitride (SiN) layer, a tantalum oxide ($Ta_2O_5$) layer, a hafnium oxide ($HfO_2$) layer, a barium-strontium titanate (Ba—$SrTiO_3$; BST) layer, and a strontium titanate ($SrTiO_3$; ST) layer.

The method may further include forming a lower insulation layer and a lower interconnection line whose sidewalls are at least covered by the lower insulation layer before the interlayer insulation layer and the fixed charge plates are formed. The method may further include forming vias which connect the fixed charge plates to the lower interconnection line while forming the interlayer insulation layer and the fixed charge plates.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
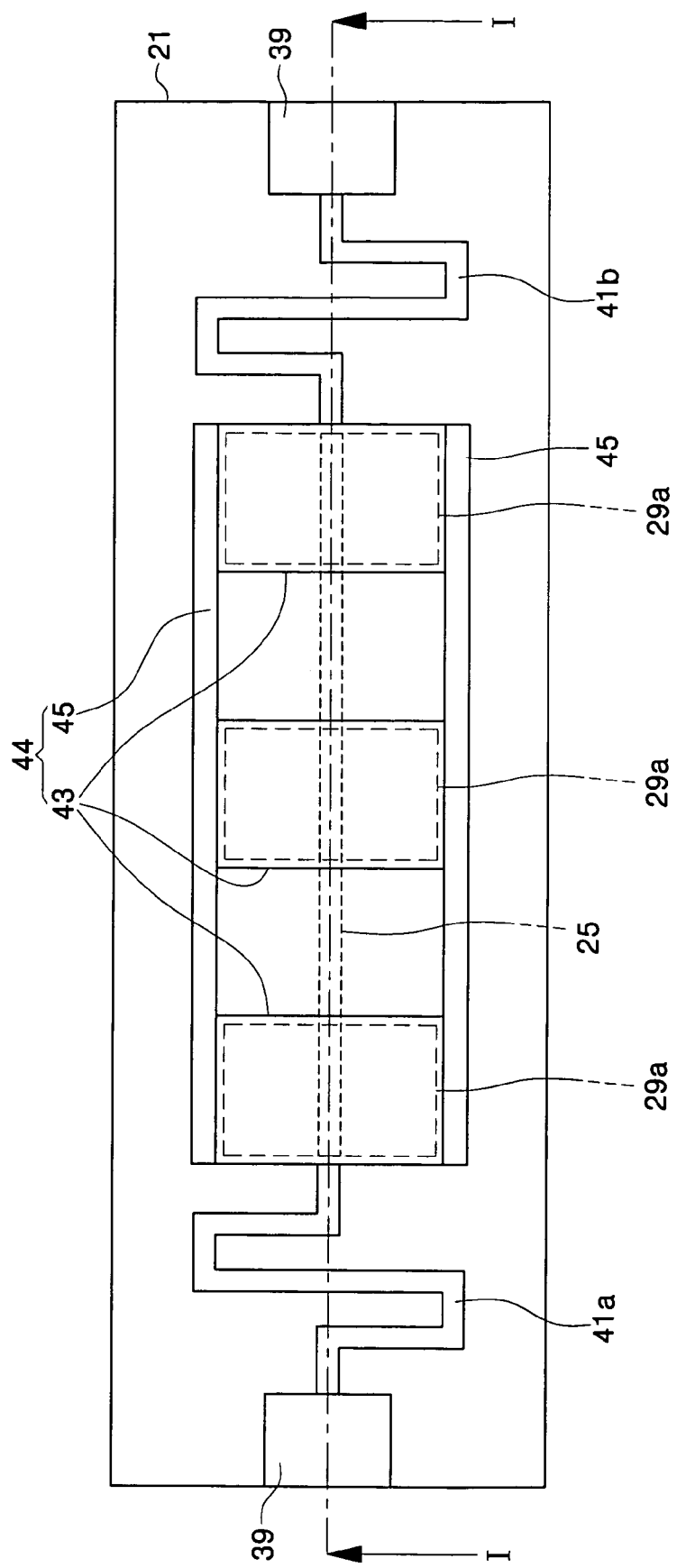
FIG. 1 illustrates a plan view of a MEMS tunable capacitor according to an embodiment of the present invention.

Korean Patent Application No. 2004-7363, filed on Feb. 4, 2004, in the Korean Intellectual Property Office, and entitled: "MEMS Tunable Capacitor with Wide Tuning Range and Method of Fabricating the Same," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
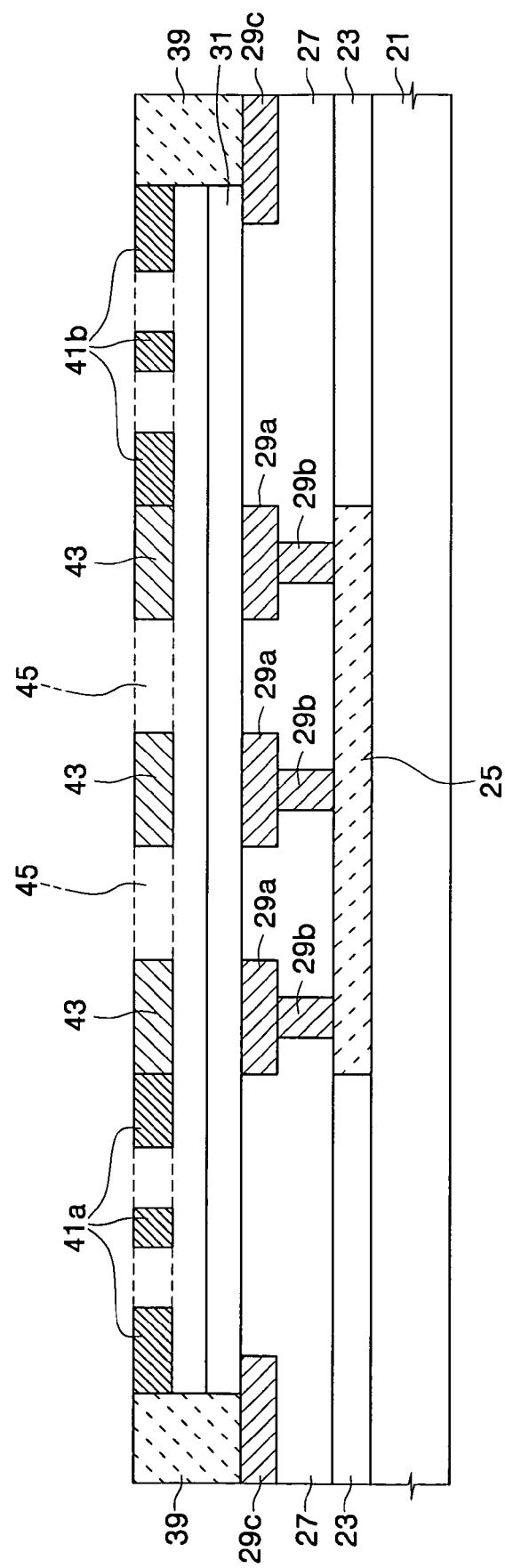
FIG. 2 illustrates a schematic cross-sectional view, taken along the line I—I of FIG. 1, of a MEMS tunable capacitor according to an embodiment of the present invention.

FIG. 1 illustrates a plan view of a MEMS tunable capacitor according to an embodiment of the present invention. FIG. 2 illustrates a cross-sectional view taken along the line I—I of FIG. 1.

Referring to FIGS. 1 and 2, a plurality of fixed charge plates 29a is placed above a substrate 21. The substrate 21 may be a silicon substrate or a silicon-on-insulator (SOI) substrate. Although not shown, the substrate 21 may have discrete elements, e.g., a transistor, thereon.

The plurality of fixed charge plates 29a is arranged to be at a same level and in the shape of comb-teeth on the substrate 21, which is arranged at a predetermined interval on the substrate 21. An interlayer insulation layer 27 separates each of the plurality of fixed charge plates 29a from one another. Each of the plurality of fixed charge plates 29a are electrically connected to one another. A lower interconnection line 25 may be arranged below the plurality of fixed charge plates 29a and in a lower insulation layer 23. The lower interconnection line 25 crosses the plurality of fixed charge plates 29a. Each of the plurality of fixed charge plates 29a directly contacts a top surface of the lower interconnection line 25 to be electrically connected to one another. Vias 29b may be interposed between each of the plurality of fixed charge plates 29a and the lower interconnection line 25, thereby electrically connecting each of the plurality of fixed charge plates 29a to the lower interconnection line 25.

A capacitor dielectric layer 31 covers the plurality of fixed charge plates 29a. The capacitor dielectric layer 31 may be a high-k dielectric layer, e.g., a silicon nitride (SiN) layer, a tantalum oxide ($Ta_2O_5$) layer, a hafnium oxide ($HfO_2$) layer, a barium-strontium titanate (Ba—$SrTiO_3$; BST) layer, or a strontium titanate ($SrTiO_3$; ST) layer.

A movable charge plate structure 44 is arranged above the plurality of fixed charge plates 29a, and is spaced apart from the capacitor dielectric layer 31. The movable charge plate structure 44 includes movable charge plates 43, which are arranged corresponding to the plurality of fixed charge plates 29a. Each of the movable charge plates 43 is arranged above the corresponding fixed charge plates 29a, respectively. Therefore, the movable charge plates 43 are arranged in the shape of comb-teeth like the plurality of fixed charge plates 29a. The movable charge plate structure 44 may include at least one connection part 45 which physically connects the movable charge plates 43 to one another. Each connection part 45 connects to an end portion of the movable charge plates 43. The movable charge plates 43 may also be electrically connected to one another through each connection part 45. When the connection part 45 electrically connects the movable charge plates 43, the connection part 45 may be located outside the fixed charge plates 29a, so that the connection part 45 does not overlap the fixed charge plates 29a. Thus, any conductive connection part 45 does not affect the variation of capacitance.

Spring structures 41a and 41b are connected to the movable charge plate structure 44, so that the movable charge plate structure 44 may move in a horizontal direction. The spring structures 41a and 41b support the movable charge plate structure 44 so that the movable charge plate structure 44 may be spaced apart from the capacitor dielectric layer 31. The spring structures 41a and 41b may be connected to both sides of the movable charge plate structure 44. The spring structures 41a and 41b shrink and expand in a horizontal direction due to an external force to horizontally move the movable charge plate structure 44. The spring structures 41a and 41b may be a thermal actuator. In other words, the spring structures 41a and 41b may thermally expand by Joule heat to thereby move the movable charge plate structure 44 in a horizontal direction. When the spring structures 41a and 41b are thermally controlled, they are preferably not symmetric. Further, the spring structures 41a and 41b may have the same or different structures. For example, one of the spring structures 41a and 41b may be a thermal actuator, and the other may be a simple spring structure. Therefore, the spring structures 41a and 41b may be fabricated using different processes.

The spring structures 41a and 41b are supported by supporters 39, respectively. The supporters 39 are fixed on the substrate 21. Power lines 29c may be connected to the supporters 39. The power lines 29c are electrically connected to the movable charge plates 43 through the supporters 39 and the spring structures 41a and 41b.

The plurality of fixed charge plates 29a and the corresponding movable charge plates 43 may have the same width. In addition, each of the plurality of fixed charge plates 29a may be spaced by a width of a movable charge plate 43 from each other. Therefore, the movable charge plates 43 may be positioned to fully overlap the fixed charge plates 29a or not to overlap above the fixed charge plates 29a at all. As a result, the capacitor according to an embodiment of the present invention has a wide tuning range, and, thus, a wide capacitance variation range.

The MEMS tunable capacitor according to an embodiment of the present invention has a wide tuning range even though it moves a short distance in a horizontal direction. Also, since the capacitor dielectric layer 31 is interposed between the movable charge plates 43 and the fixed charge plates 29a, a short circuit between the plates 29a and 43 is prevented.

Hereinafter, stages of a method of fabricating the MEMS tunable capacitor according to an embodiment of the present invention will be described in more detail.

FIGS. 3 through 6 illustrate cross-sectional views taken along the line I—I of FIG. 1, of stages of a method of fabricating a MEMS tunable capacitor according to an embodiment of the present invention.

Figure 3:
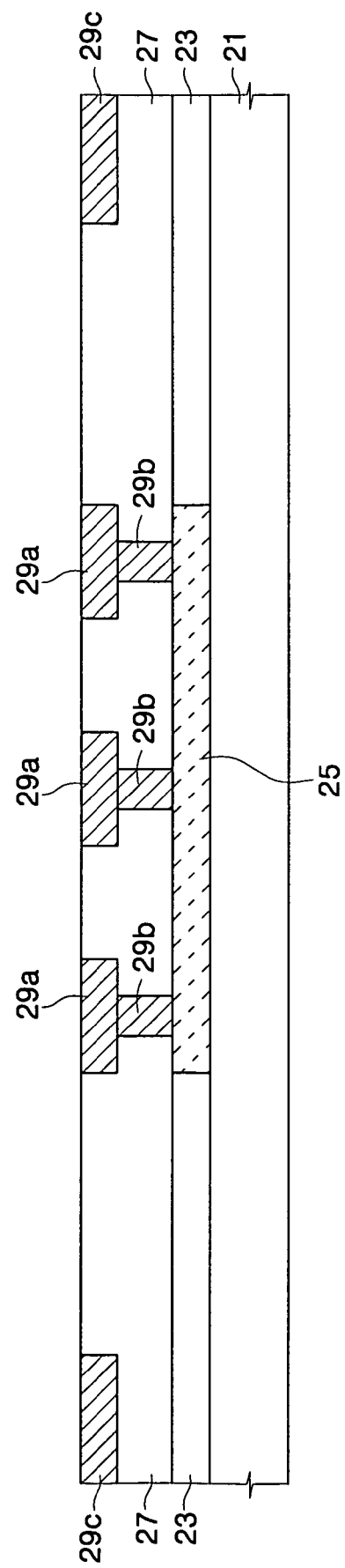
FIGS. 3 through 6 illustrate cross-sectional views taken along the line I—I of FIG. 1, illustrating stages in a method of fabricating a MEMS tunable capacitor as shown in FIGS. 1 and 2.

Referring to FIGS. 1 and 3, the substrate 21 is prepared. The substrate 21 may be a silicon substrate or a SOI substrate. The interlayer insulation layer 27 and the plurality of fixed charge plates 29a separated from each other by the interlayer insulation layer 27 are formed above the substrate 21. Here, the plurality of fixed charge plates 29a is arranged in the shape of comb-teeth, which is arranged at a predetermined interval.

The lower insulation layer 23 and the lower interconnection line 25, whose sidewalls are at least covered by the lower insulation layer 23, may be formed before forming the interlayer insulation layer 27 and the plurality of fixed charge plates 29a. The lower interconnection line 25 may be formed using a damascene process. In other words, the lower insulation layer 23 is formed on the substrate 21, and then patterned to form a groove, which defines a region of the lower interconnection line 25. Subsequently, the lower interconnection line 25 fills the groove.

Alternatively, the lower interconnection line 25 may be formed by photolithography and etching processes. In other words, a conductive layer is formed on the substrate 21 and then patterned to form the lower interconnection line 25. Thereafter, the lower insulation layer 23 covers the lower interconnection line 25 and is then planarized. As a result, the lower interconnection line 25 and the lower insulation layer 23 which covers the sidewalls of the lower interconnection line 25 are formed.

The interlayer insulation layer 27 and the plurality of fixed charge plates 29a may be formed by the damascene process. In other words, the interlayer insulation layer 27 is formed over the substrate 21 having the lower interconnection line 25 and then patterned to form grooves which define regions of the fixed charge plates 29a. At the same time, via holes may be formed to expose the lower interconnection line 25. Thereafter, a conductive layer fills the via holes and the grooves, and is then planarized until the interlayer insulation layer 27 is exposed, thereby forming the vias 29b and the fixed charge plates 29a. The vias 29b may be omitted. In this case, the grooves are formed to expose the lower interconnection line 25.

Alternatively, the interlayer insulation layer 27 and the plurality of fixed charge plates 29a may be formed by photolithography and etching processes. In other words, a first interlayer insulation layer is formed above the substrate 21 having the lower interconnection line 25. The first interlayer insulation layer is patterned to form via holes which expose the lower interconnection line 25. Then, a conductive layer fills the via holes and covers the first interlayer insulation layer. The conductive layer is patterned by the photolithography and etching processes to form the plurality of fixed charge plates 29a. A second interlayer insulation layer is formed above the substrate 21 having the fixed charge plates 29a. The second interlayer insulation layer is planarized until the fixed charge plates 29a are exposed. As a result, the second interlayer insulation layer covers sidewalls of the fixed charge plates 29a, and top surfaces of the fixed charge plates 29a are exposed. When the fixed charge plates 29a directly contact the lower interconnection line 25, processes of forming the first interlayer insulation layer and the via holes may be omitted.

The fixed charge plates 29a may include copper (Cu). The power lines 29c may also be formed while the fixed charge plates 29a are being formed. The power lines 29c are formed outside the fixed charge plates 29a. The power lines 29c may be formed of the same material as the fixed charge plates 29a.

Figure 4:
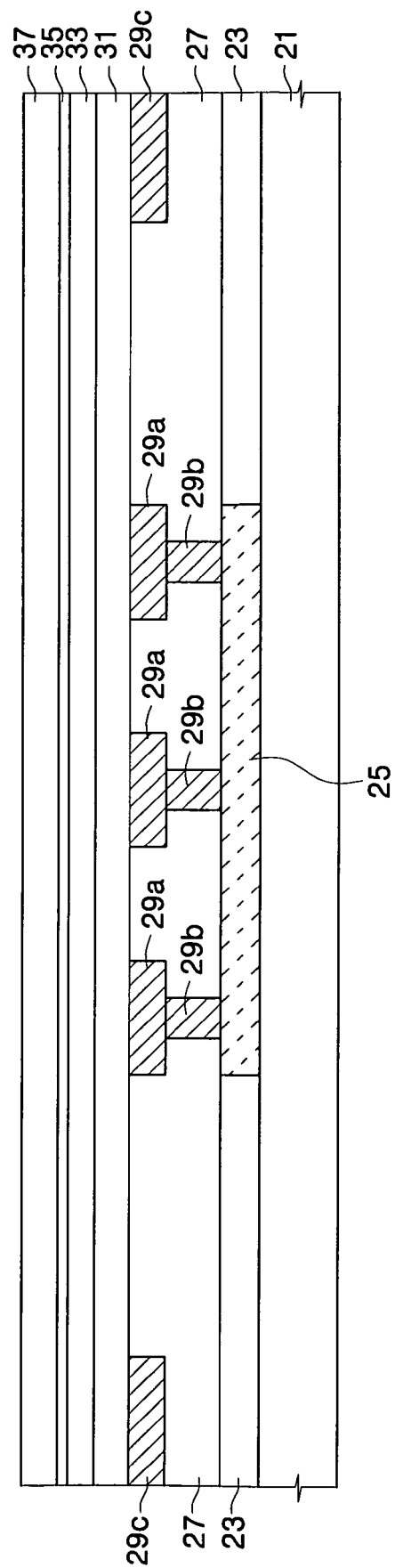

Referring to FIGS. 1 and 4, the capacitor dielectric layer 31 is formed above the substrate 21 having the plurality of fixed charge plates 29a. The capacitor dielectric layer 31 covers both top surfaces of the plurality of fixed charge plates 29a and top surfaces of the power lines 29c. The capacitor dielectric layer 31 may be a high-k dielectric material. The capacitor dielectric layer 31 may be formed of a silicon nitride (SiN) layer, a tantalum oxide ($Ta_2O_5$) layer, a hafnium oxide ($HfO_2$) layer, a barium-strontium titanate (Ba—$SrTiO_3$; BST) layer, a strontium titanate ($SrTiO_3$; ST) layer, or at least two stacked layers selected from this group.

A sacrificial layer 33 and a molding layer 37 are formed on the capacitor dielectric layer 31. An etch-stop layer 35 may be formed before the molding layer 37 is formed. The sacrificial layer 33 may be removed using a wet-etching process in a subsequent process. Therefore, the sacrificial layer 33 may be formed of a material layer having a wet-etching selectivity to the capacitor dielectric layer 31. The sacrificial layer 33 may be formed of a silicon oxide ($SiO_2$) layer, an aluminum oxide ($Al_2O_3$), or a stacked layer of these layers. The molding layer 37 may be formed of a photoresist layer or a silicon oxide layer.

Figure 5:
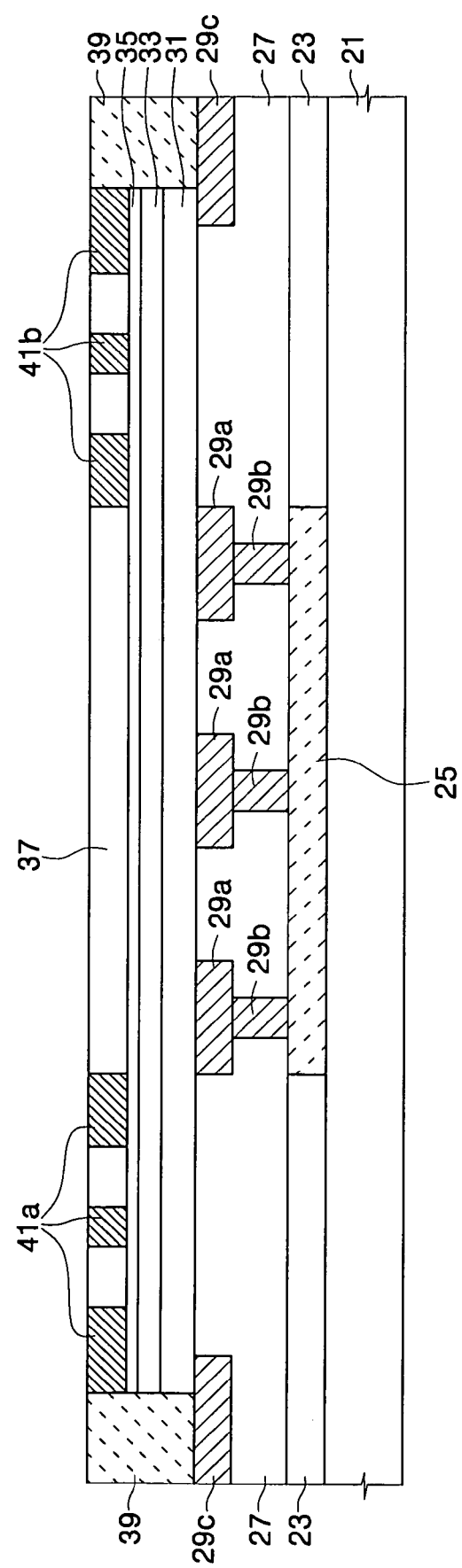

Referring to FIGS. 1 and 5, the molding layer 37, the etch-stop layer 35, the sacrificial layer 33, and the capacitor dielectric layer 31 are sequentially patterned to form grooves, which expose the power lines 29c. Thereafter, a material layer fills the grooves. The material layer may be planarized to form the supporters 39. The material layer may be a conductive layer. The supporters 39 are fixed on the substrate 21.

After the supporters 39 are formed, the molding layer 37 is patterned to form trenches, which define spring regions. When the molding layer 37 is formed of a photoresist layer, the molding layer 37 may be patterned by photolithography and development processes. When the molding layer 37 is formed of an inorganic layer, e.g., a silicon oxide layer, the molding layer 37 may be patterned by photolithography and etching processes. The etching process is stopped by the etch-stop layer 35. Thereafter, a material layer fills the trenches, which define the spring regions, and is then planarized to thereby form spring structures 41a and 41b. The spring structures 41a and 41b may be silicon or copper. When one of the spring structures 41a and 41b is a thermal actuator, the spring structures 41a and 41b are formed of material layers different from each other. In this case, each of the spring structures 41a and 41b is formed in the molding layer 37 by different processes. The spring structures 41a and 41b are formed to be connected to the corresponding supporters 39, respectively. The spring structures 41a and 41b may be formed before or during formation of the supporters 39.

Figure 6:
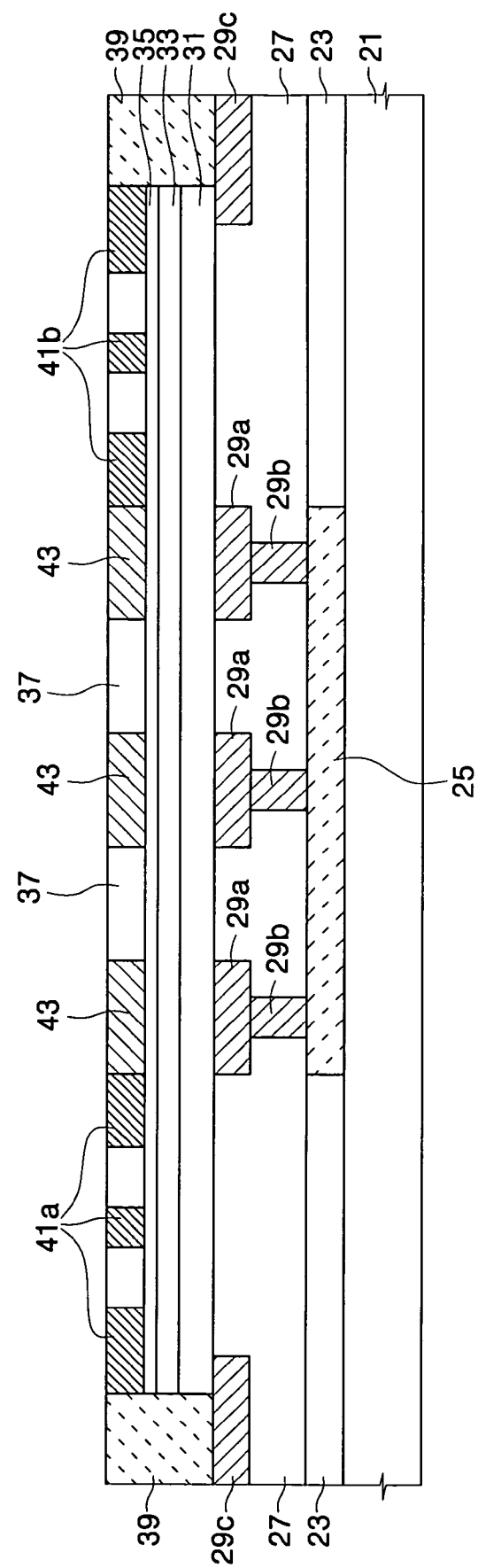

Referring to FIGS. 1 and 6, after the spring structures 41a and 41b are formed, the molding layer 37 is again patterned to form trenches which define a movable charge plate region. Simultaneously, a trench which defines at least one connection region may be formed. The connection region may be connected to one end of the movable charge plate region. Two connection regions may be formed to connect both ends of the movable charge plate region, respectively. Thereafter, a plate conductive layer fills the trenches and is then planarized to form the movable charge plates 43 and the connection parts 45. The plate conductive layer may be a copper layer.

The connection parts 45 may be formed before or after the movable charge plates 43 are formed. In this case, the connections 45 may be formed of a material layer different from the movable charge plates 43.

The movable charge plates 43 may be formed before or during formation of the spring structures 41a and 41b. In particular, if the movable charge plates 43 are formed of the same material layer as the spring structures 41a and 41b, the movable charge plates 43 and the spring structures 41a and 41b may be formed concurrently.

After the movable charge plates 43 and the connections 45 are formed, the molding layer 37, the etch-stop layer 35, and the sacrificial layer 33 may be removed, e.g., using a wet-etching process. As a result, the MEMS tunable capacitor in which the upper movable charge plates may move in a horizontal direction is completed as shown in FIG. 2.

As described herein above, according to the present invention, a MEMS tunable capacitor may prevent a short circuit between the plates from occurring by arranging the capacitor dielectric layer on a plurality of fixed charge plates and also have a wide tuning range by employing comb-teeth shaped plates. In addition, a MEMS tunable capacitor having a wide tuning range compared with the conventional art while preventing a short circuit between plates from occurring, may be fabricated.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A MEMS tunable capacitor, comprising:
a substrate;
a plurality of fixed charge plates on the substrate, the plurality of fixed charge plates having a same height, being arranged at a predetermined interval and being electrically connected to one another;
a capacitor dielectric layer covering the plurality of fixed charge plates;
a movable charge plate structure spaced apart from the capacitor dielectric layer, and arranged on the plurality of fixed charge plates, wherein the movable charge plate structure includes a plurality of movable charge plates arranged corresponding the plurality of fixed charge plates; and
an actuator connected to the movable charge plate structure allowing the movable charge plate structure to move in a horizontal direction.

2. The MEMS tunable capacitor as claimed in claim 1, wherein the movable charge plate structure further comprises at least one connection part which physically connects the movable charge plates.

3. The MEMS tunable capacitor as claimed in claim 2, wherein the at least one connection part connects end portions of the movable charge plates.

4. The MEMS tunable capacitor as claimed in claim 1, wherein corresponding ones of the plurality of fixed charge plates and the plurality of movable charge plates have a same width.

5. The MEMS tunable capacitor as claimed in claim 1, wherein each of the plurality of fixed charge plates is spaced apart from each other by at least a width of a corresponding movable charge plate.

6. The MEMS tunable capacitor as claimed in claim 1, further comprising a supporter fixed on the substrate supporting the actuator.

7. The MEMS tunable capacitor as claimed in claim 6, further comprising a power line connected to the supporter, the power line being electrically connected to the movable charge plates through the supporter and the actuator.

8. The MEMS tunable capacitor as claimed in claim 1, further comprising a lower interconnection line arranged below the plurality of fixed charge plates and connecting the plurality of fixed charge plates, the plurality of fixed charge plates being electrically connected to each other through the lower interconnection line.

9. The MEMS tunable capacitor as claimed in claim 8, further comprising vias which electrically connect the lower interconnection line and each of the plurality of fixed charge plates.

10. The MEMS tunable capacitor as claimed in claim 1, wherein the actuator is a spring structure.

11. The MEMS tunable capacitor as claimed in claim 10, wherein the spring structure comprises a first spring attached to a first end of the movable charge plate structure and a second spring attached to a second end of the movable charge plate structure.

12. The MEMS tunable capacitor as claimed in claim 11, wherein the first and second springs are different.

13. The MEMS tunable capacitor as claimed in claim 12, wherein one of the first and second springs is a thermal actuator.

* * * * *